United States Patent
Yeung et al.

(10) Patent No.: US 8,516,281 B2
(45) Date of Patent: *Aug. 20, 2013

(54) ON DEMAND HARD DISK DRIVE SYSTEM ON A CHIP POWER CONTROL SCHEME

(75) Inventors: Kwok W. Yeung, Milpitas, CA (US); Kin Ming Chan, Milpitas, CA (US)

(73) Assignee: SK hynix memory solutions inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/529,980

(22) Filed: Jun. 21, 2012

(65) Prior Publication Data

US 2012/0260114 A1  Oct. 11, 2012

Related U.S. Application Data

(63) Continuation of application No. 12/150,932, filed on Apr. 30, 2008, now Pat. No. 8,230,244.

(51) Int. Cl.
*G06F 1/00* (2006.01)

(52) U.S. Cl.
USPC .......................................................... 713/300

(58) Field of Classification Search
USPC .................................................. 713/300, 320
See application file for complete search history.

(56) References Cited

U.S. PATENT DOCUMENTS

| | | | | |
|---|---|---|---|---|
| 5,854,720 | A | * | 12/1998 | Shrinkle et al. ............... 360/69 |
| 6,725,385 | B1 | * | 4/2004 | Chu et al. ..................... 713/320 |
| 2003/0105983 | A1 | * | 6/2003 | Brakmo et al. ............... 713/320 |

* cited by examiner

*Primary Examiner* — Mohammed Rehman
(74) *Attorney, Agent, or Firm* — Van Pelt, Yi & James LLP (57) ABSTRACT

An access instruction associated with accessing a target location in a disk is obtained. A number of units until the target location is accessed is calculated. It is determined whether there is time for the group of logic to transition from a lower power state to an operational state; the determination is based at least in part on the number of units between a current location of a read head associated with the hard disk system and the target location which is different from the current location of the read head and a warm up time associated with the group of logic. If it is determined there is time, the group of logic is put into the lower power state.

20 Claims, 7 Drawing Sheets

ON DEMAND HARD DISK DRIVE SYSTEM ON A CHIP POWER CONTROL SCHEME

CROSS REFERENCE TO OTHER APPLICATIONS

This application is a continuation of co-pending U.S. patent application Ser. No. 12/150,932, entitled ON DEMAND HARD DISK DRIVE SYSTEM ON A CHIP POWER CONTROL SCHEME filed Apr. 30, 2008 which is incorporated herein by reference for all purposes.

BACKGROUND OF THE INVENTION

There is a growing interest in reducing the power consumption of electronic devices, such as hard disk drive systems. For example, if a hard disk drive system operates off a battery, the battery life can be extended by reducing power consumption. Even in the case of an AC power supply, consumers are becoming increasingly aware about power consumption and the natural resources (such as coal or oil) that are consumed to generate that power. It would be desirable if techniques for saving power in hard disk drive systems could be developed.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
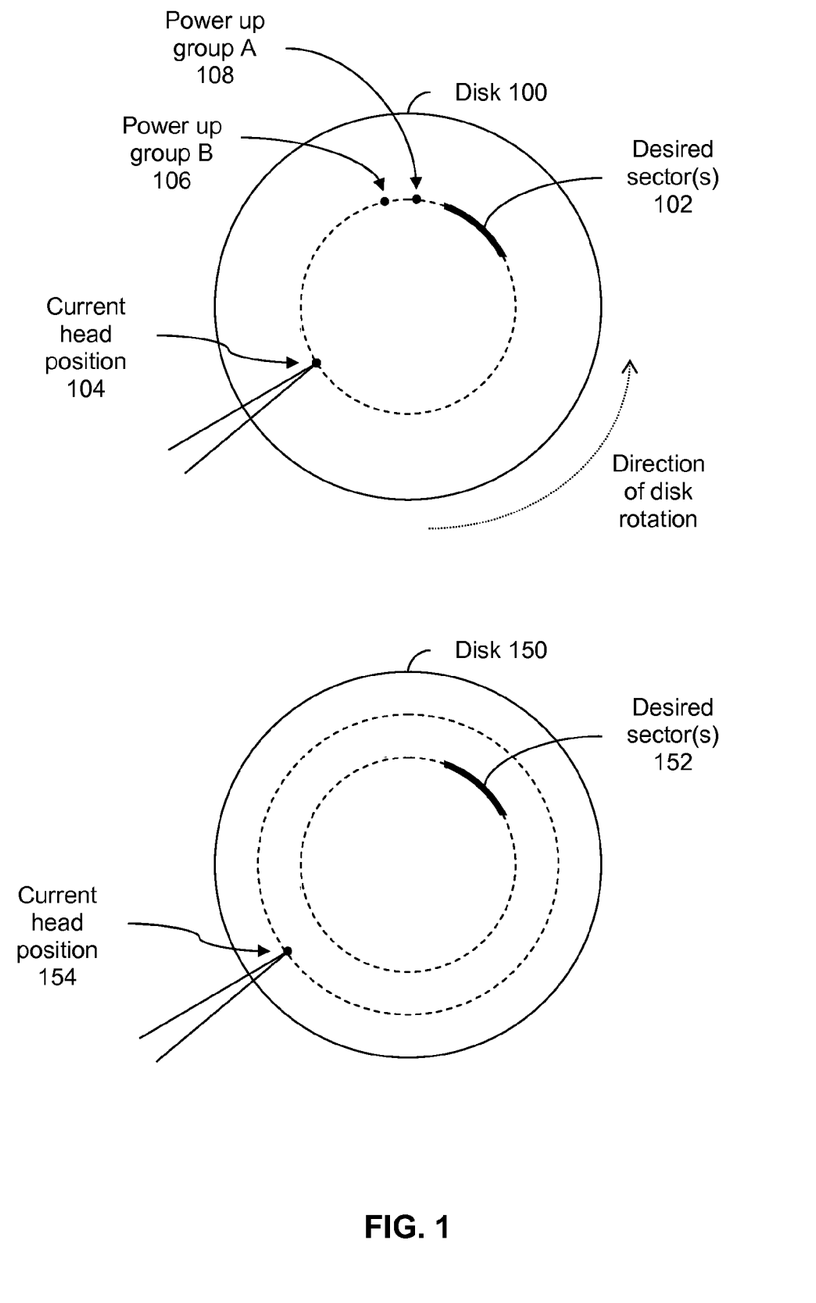
FIG. 1 is a diagram showing two disks.

FIG. 1 is a diagram showing two disks. In the example shown, data is stored (e.g., magnetically or optically) on disk 100 which has a plurality of concentric tracks, one track of which is shown with a dashed line. Each track is divided into sectors, for example, numbered consecutively in a (counter) clockwise direction. A read head on an arm is used to read or write data to or from disk 100. The current position of the head is shown at position 104.

A power saving technique is disclosed herein which powers down some portion of a disk drive system while waiting for the read head to reach or access desired sector(s). A desired sector is sometimes referred to as a target sector. At an appropriate or sufficient point before the head position reaches the desired sector(s), the powered down portion is powered up. In the example case of disk 100, the current head position (104) has not yet reached desired sector(s) 102 and some portion of a disk drive system is powered down. When current head position 104 reaches point 106, group B is powered up. When current head position 104 reaches point 108, group A is powered up. In various embodiments, group A or group B includes logic associated with a read channel (e.g., logic that performs processing related to reading data stored on a disk) and/or logic related to writing data. In some embodiments, group A and/or group B is powered down after the current head position 104 has passed desired sector(s) 102.

Disk 150 shows another example in which the power saving technique described herein can be applied. In this particular example, current head position 154 is on a different track compared to desired sector(s) 152. As in the example of disk 100, some portion(s) of a disk drive system is/are powered down before being powered back up at appropriate point(s) before reaching desired sector(s) 152.

The power saving technique can be thought of as "on-demand". That is, the powering up/down of groups of logic in a disk drive system (and the resulting power savings) will respond to or otherwise change with requests from (for example) an upper layer application to access data on the disk, which causes the related sectors to become desired sectors. For example, if the upper layer application is inactive for a period of time, a disk drive system can be powered down for the period of inactivity. As the upper layer application (other entity) desires access to certain sectors, the logic is powered down and up at appropriate times.

In various embodiments, the power saving technique is performed in hardware or software. Some hardware embodiments are described first and some software embodiment are described after the hardware examples.

Figure 2:
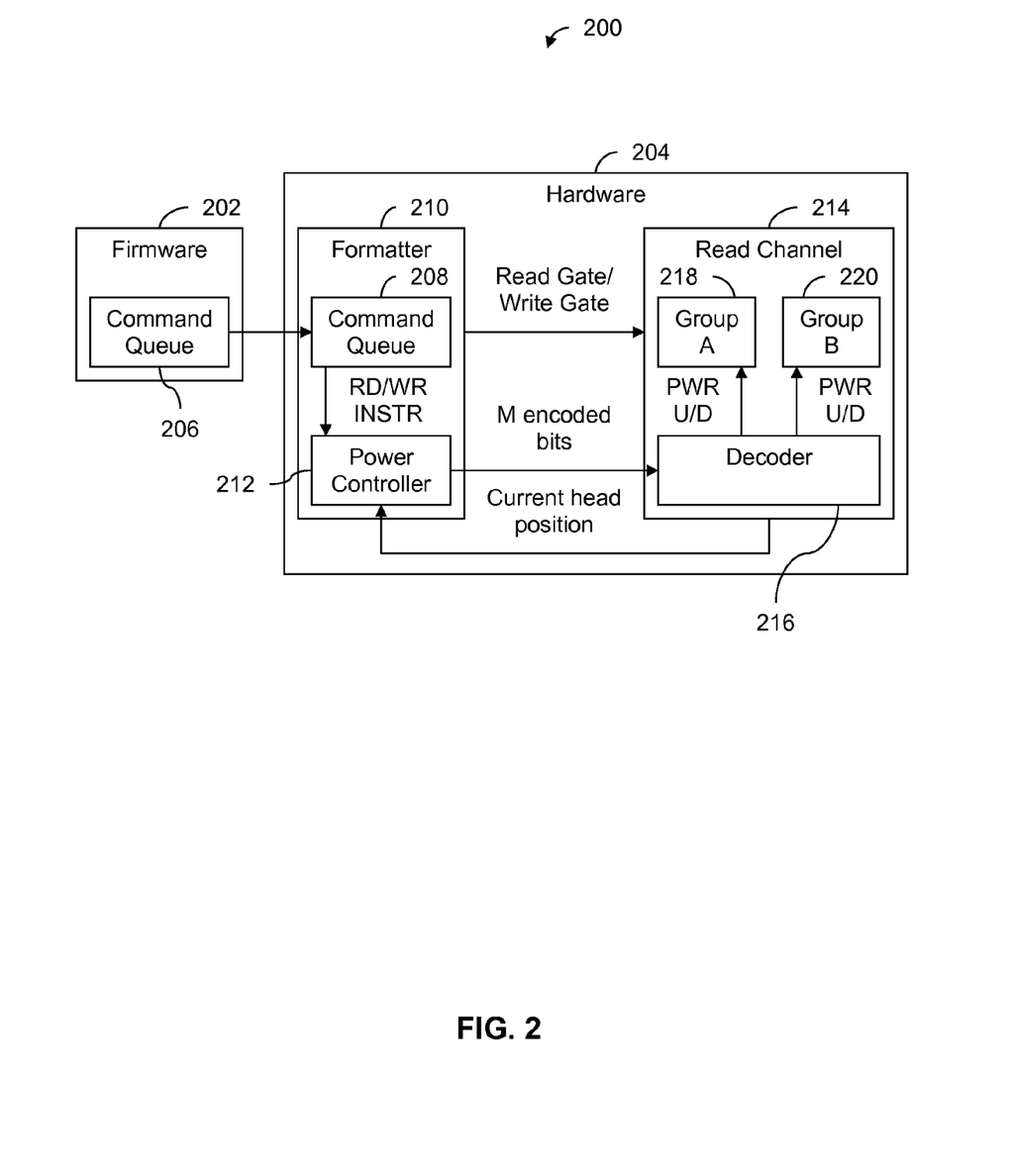
FIG. 2 is a system diagram showing an embodiment in which decision making regarding power states is performed in hardware.

FIG. 2 is a system diagram showing an embodiment in which decision making regarding power states is performed in hardware. In the example shown, system 200 includes firmware (or more generally, software) 202 and hardware 204. In various embodiments, hardware 204 includes an application-specific integrated circuit (ASIC), field-programmable gate array (FPGA), a microprocessor, etc.

Firmware 202 includes command queue 206 which stores read instructions and write instructions to be passed to hardware 204 for processing and accessing of a disk for reading data from or writing data to. For example, an upper layer application may request some data to be read or written and the data corresponds to certain sectors. As an example, a read instruction may be in the form "Read sector(s) 100-102" and a write instruction may be in the form "Write <value> to sector 88". Read and write instructions are more generally referred to as access instructions.

Instructions in command queue 206 of firmware 202 are passed to command queue 208 of formatter 210 in hardware 204. In some embodiments, command queues 206 and 208 are first in, first out (FIFO) devices. In this example, formatter 210 parses the instructions in command queue 208 and outputs a read gate/write gate signal with the appropriate signal level at the appropriate time. For example, the read gate/write gate signal may be driven high by formatter 210 when the head position passed over a desired sector.

A copy of the read and write instructions are passed from command queue 208 to power controller 212. Based on the current head position (output by read channel 214) and the read and write instructions obtained from command queue 208, power controller 212 determines power states and adjusts the values of M encoded bits. In some embodiments, read and write instructions are obtained from command queue 208 before they are actually executed or performed. For example, this may enable power controller 212 to know ahead of time what access instructions are coming up and appropriate point(s) and power states. Referring back to FIG. 1, when current head position 104 reaches point 106, group B is powered up. Similarly, when current head position 104 reaches point 108, group A is powered up.

The M encoded bits output by power controller 212 are received by decoder 216 which controls power up/down signals to group A (218) and group B (220). M equals 2 in this example and 00=groups A and B powered down, 01=group A is powered down and group B powered up, 10=groups A and B are powered up, and 11=an undefined state. In some other embodiments, M is a different number. Although a state where group A is powered up and group B is powered down is possible, it is inefficient as is explained in further detail below and is therefore not used in this example.

Although the phrase "powering down" is used in this example, in general what is meant is to reduce power compared to a normal operating state. In some embodiments, some power is still supplied to a group of logic, but the amount of power supplied is lower than what would normally be supplied if the group were operating or functioning normally.

In some embodiments, groups of logic are grouped or organized based on similar amounts of time required to operate properly once powered on. In the case of a phase lock loop (PLL) for example, this time includes a lock time. For convenience, this amount of time is referred to herein as a warm up time or warm up requirement. In this example, logic in group A has the same or similar warm up times, which is different from the warm up time(s) for logic in group B. For example, the logic in group A may have a longer warm up time than the logic in group B.

The system shown in FIG. 2 is an example and some other embodiments have different configurations. For example, power controller 212 may output power up/down signals which are passed directly to groups A and B (218 and 220).

In some applications, it may be desirable to implement power saving in hardware as described herein. For example, the power saving related processing performed by hardware 204 is transparent to firmware 202. In some cases, the power up/down requirements of each logic group under the power control scheme is highly depend on the particular design. In some cases, firmware does not know and does not need to know about these requirements as they are hardware specific. In some applications, it is desirable to keep these hardware related details in hardware which enables firmware to be (more) independent and (more) portable across different hardware platforms.

Figure 3:
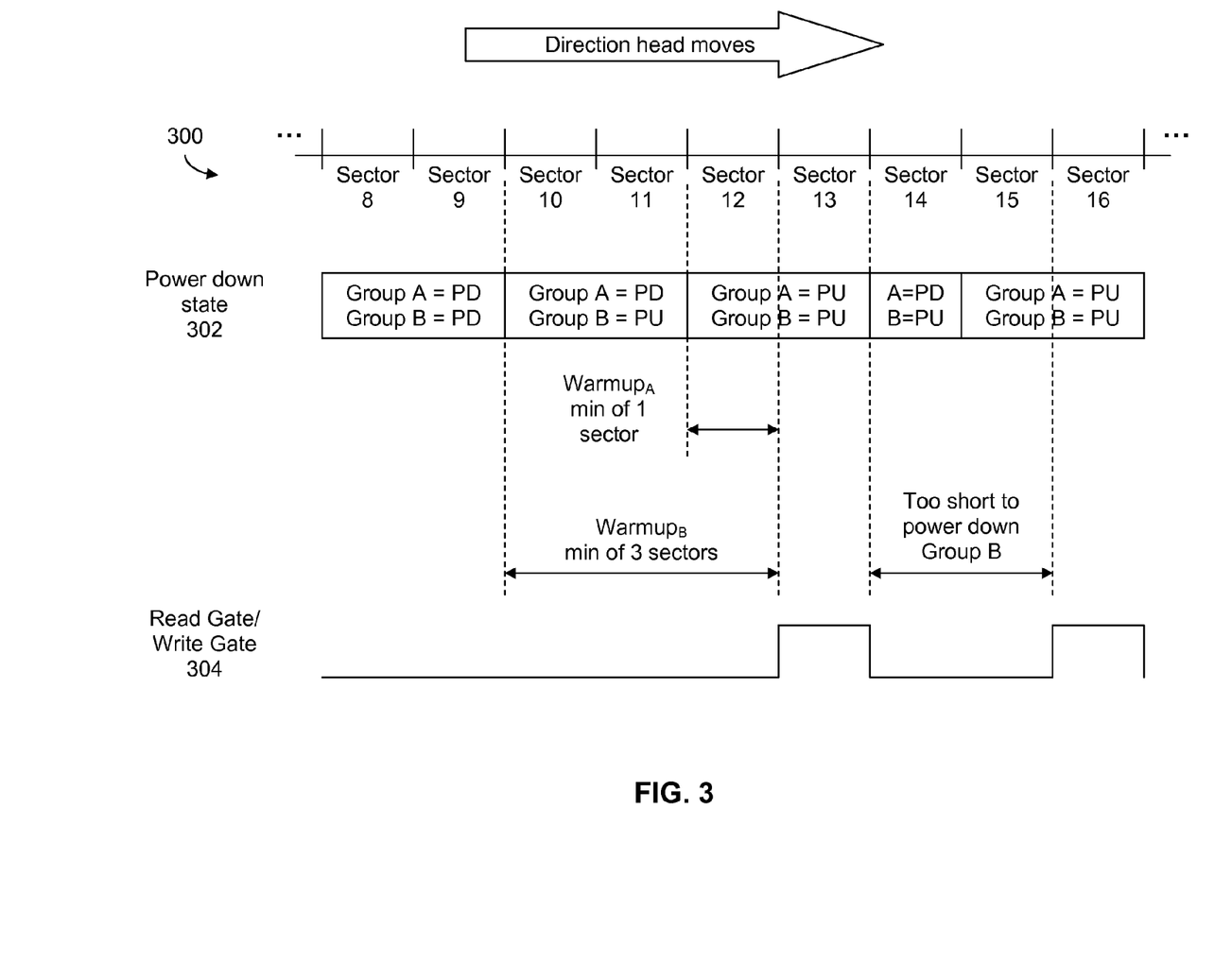
FIG. 3 is a diagram showing the power states and corresponding sectors for two groups of logic.

FIG. 3 is a diagram showing the power states and corresponding sectors for two groups of logic. FIG. 3 corresponds to the example system of FIG. 2. Group A (218 in FIG. 2) has a warm up time of one sector and group B (220 in FIG. 2) has a warm up time of three sectors. In the examples described herein, warm up time or requirements are expressed in units of sectors. In various embodiments, warm up requirements can be express in any appropriate unit such as time, microprocessor "ticks", distance, etc.

In the example shown, two access events occur at sectors 13 and 16. See, for example, sectors 300 and read gate/write gate signal 304; there is an instruction to read/write data at sector 13 and another instruction to read/write data at sector 16. Since no data is being written to or read from sectors 8-12 and 14-15, parts of the hard disk drive system (in this case groups A and B associated with a read channel) can be powered down. Power down states 302 shows the state of groups A and B. During sectors 8-9, groups A and B are powered down (e.g., by power controller 212 outputting the appropriate values on the M encoded bits). To ensure that group B has sufficient time to warm up, during sectors 10-11, group B is powered up while group A remains powered down. At sector 12, group A is powered up.

Between the read/write events at sectors 13 and 16, there is not enough time for group B to be powered down and up again with sufficient time to operate properly at sector 16. As a result, only group A is powered down at sector 14 and it is powered up during sectors 15-16.

As shown here, although it is possible to have a state where group A is powered up and group B is powered down, it does not conserve as much power as the states shown here. Assuming there is enough time for group B to be powered down, since warm up$_A$ (one sector in this example)<warm up$_B$ (three sectors in this example), then there is enough time for group A to be powered down. Powering down group B alone is therefore not as power efficient as powering down both groups A and B.

Figure 4:
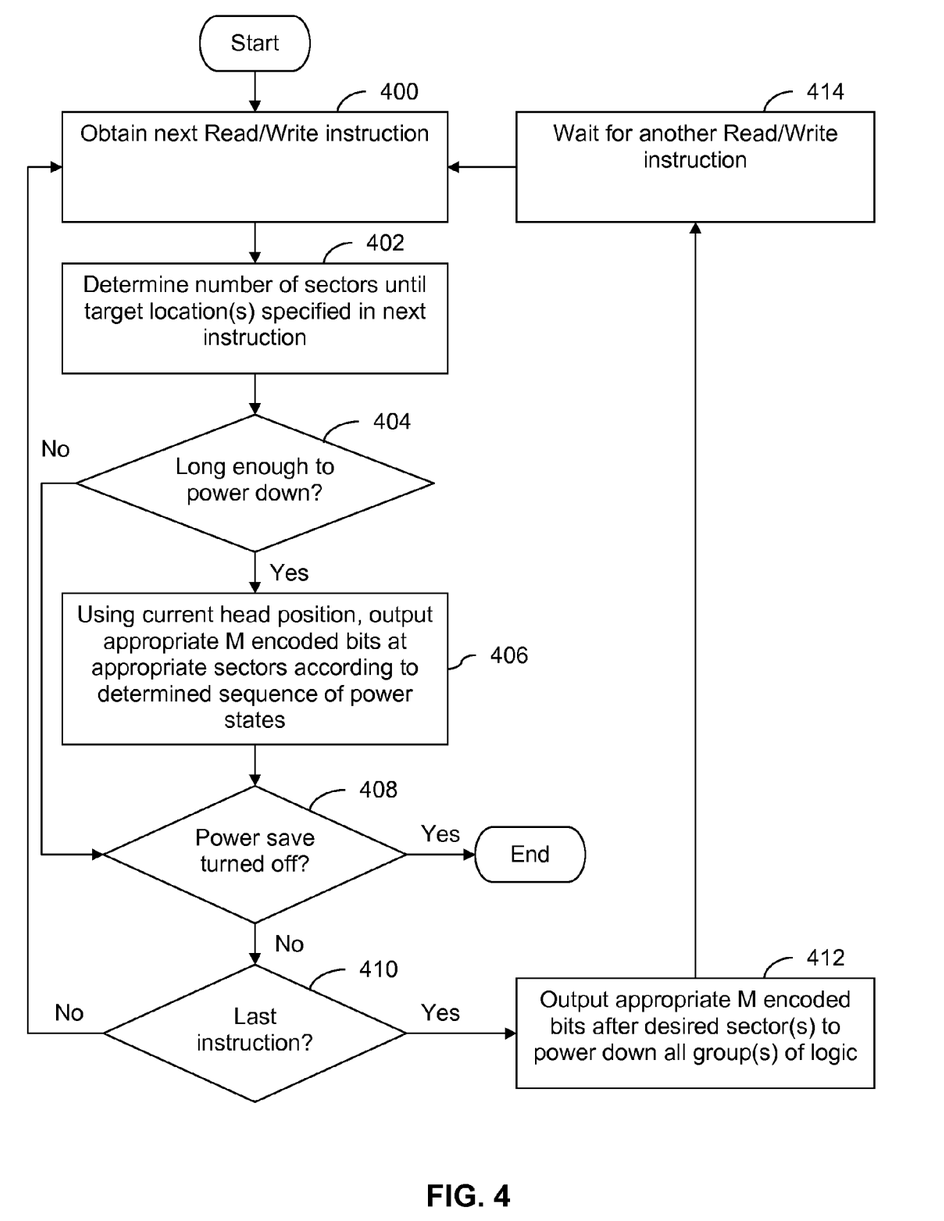
FIG. 4 is a flowchart illustrating an embodiment of a process performed by a power controller in hardware to power up/down groups of logic.

FIG. 4 is a flowchart illustrating an embodiment of a process performed by a power controller in hardware to power up/down groups of logic. In the example shown, the process is performed by power controller 212 of FIG. 2. In this particular embodiment, each decision (e.g., about what power states to put group(s) into and/or when to put a particular group into a particular power state) is made right after a read or write access is finished. For example, after accessing sector 13, a decision is made about sectors 14-15 which are prior to the next access at sector 16. At 400, the next Read/Write instruction is obtained. Based on the target location of the instruction and the current head position, power control decision is made. The same is performed for both read and write activities. At 402, the number of sectors until the target location(s) specified in the next instruction is determined. In FIG.

3, for example, there is a gap of two sectors (sectors 14-15) if the next instruction obtained at step 400 is to access sector 16.

It is determined at 404 whether it is long enough to power down. In this example, the decision is based on the number of sectors determined at 402 and the warm up requirements of the groups. In the example of FIG. 3, the gap at sectors 14-15 is not long enough to power down group B since group B requires 3 sectors to warm up. However, the gap is long enough to power down group A which only requires 1 sector to warm up. If it is long enough, using the current head position, appropriate M encoded bits are output at appropriate sectors according to a determined sequence of power states at 406. For example, when the head position in FIG. 3 reaches sector 14, the M encoded bits are set to values where group A is powered down and group B is powered up. When the head position reaches sector 15, the value of the M encoded bits is changed so that both group A and B are powered up. This gives group A enough time to warm up before accessing data at sector 16.

Otherwise, if it is not long enough at 404 or after outputting appropriate M encoded bits at 406, it is determined at 408 if power save has been turned off. In some embodiment, using a hardware register or pin, this power saving technique is turned off/on as desired. If power saving has not been turned off, it is determined at 410 whether a last instruction has been reached. If it is not the last instruction, the next Read/Write instruction is obtained at 400. Otherwise, appropriate M encoded bits are output after the desired sector(s) to power down all groups of logic at 412. At 414, there is a wait for another Read/Write instruction. For example, an upper layer application which generates access instructions may be inactive for a while and once it becomes active again more access instructions are generated and obtained. After waiting at 414, the next Read/Write instruction is obtained at 400.

In some applications, powering down all groups of logic if a last instruction is reached at step 412 is desirable because of the power savings offered. In some cases, an upper layer application or other entity may be idle for some time and the system is powered down until the next access instruction is received. In other applications where latency or response time to an access instruction must also be considered (e.g., since it is not known when an access instruction will be received), some other approach may be used. In some cases, a component may take a significant amount of time to power up (e.g., on the order of seconds or milliseconds) and it may be undesirable for the response time or latency time to a newly received access command to take that long to respond. In some embodiments, the system is put into a "moderate" power state which reduces power consumption somewhat but is a state from which the system can relatively quickly power up.

In some other embodiments, power saving is performed in software, for example by firmware which inserts power related instructions into a command queue. The following figures describe such an embodiment.

Figure 5:
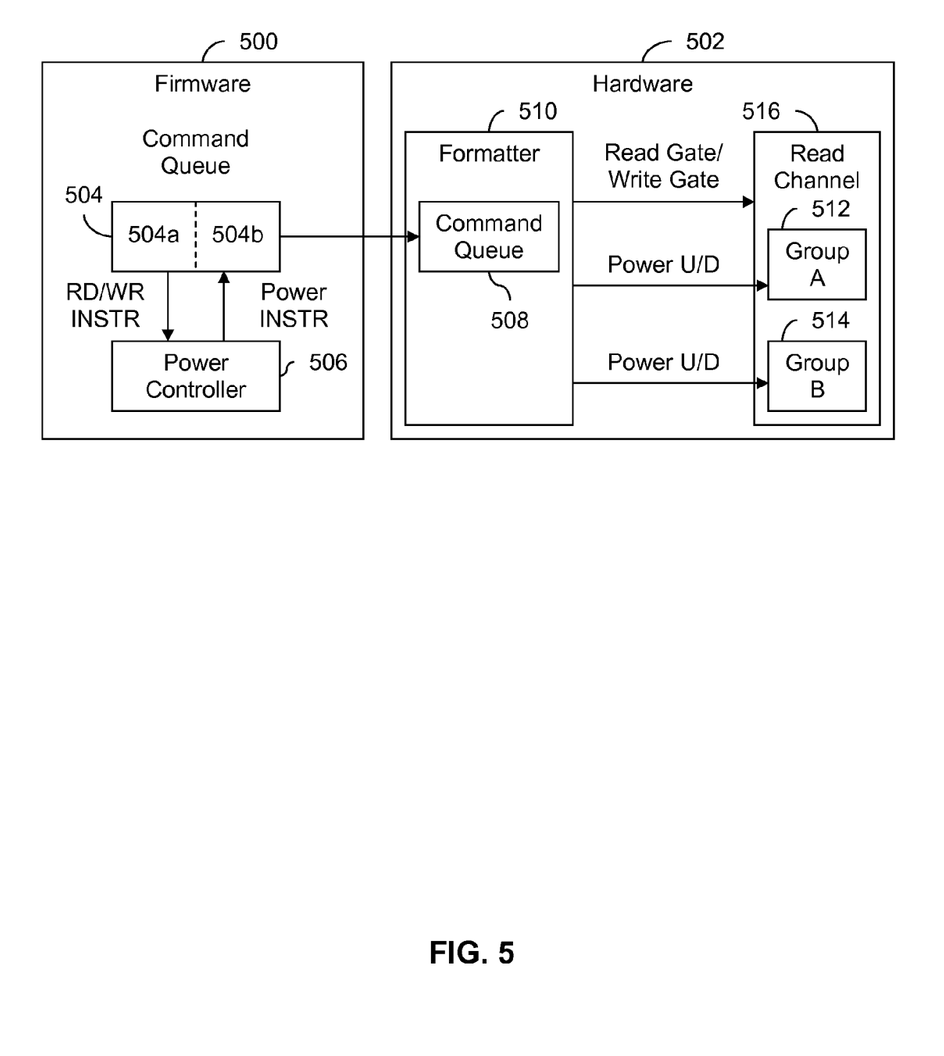
FIG. 5 is a system diagram showing an embodiment in which a power controller is included in firmware.

FIG. 5 is a system diagram showing an embodiment in which a power controller is included in firmware. In the example shown, the decision making about whether there is sufficient time to power down one or more groups of logic and, if so, what power state to be in at a particular time or sector is included in firmware. Firmware 500 includes command queue 504. Conceptually, command queue 504 is divided into two parts: before insertion of power instructions (504a) and after insertion of power instructions (504b). Portion 504a only contains access instructions such as read and write instructions, whereas portion 504b includes access instructions and power instructions. Power instructions are instructions which when executed cause a group of logic to power down or power up. Any appropriate form may be used to express a power instruction. Some examples of power instructions are "Enter <state> at <sector>" or "Power down/up <group> at <time>".

Power controller 506 obtains read and write instructions from the command queue before power instructions have been inserted (504a). Based on successive access instructions and warm up time(s) of groups of logic, power controller determines appropriate power states and/or instructions. In various embodiments, power controller 506 is informed about warm up times of groups using various inputs, registers, or any other appropriate interface. Power instructions are then inserted (where appropriate) between access instructions to obtain command queue 504b. The order of instructions in a command queue may be very important and power controller 506 in some embodiments is configured to preserve the relative ordering of access instructions with respect to other access instructions.

The access instructions and power instructions are then passed (in order) to command queue 508 in hardware 502. Formatter 510 executes the instructions and outputs a read gate/write gate signal, a power up/down signal passed to group A (512), and a power up/down signal passed to group B (514). Formatter 510 is configured to be able to properly process power instructions. In some embodiments, formatter 510 receives a head position signal (not shown) from read channel 516 to have more accurate timing information for generating the read gate/write gate signal or the power signals.

In some embodiments, having firmware or other software perform the power saving techniques disclosed herein is attractive because it can be modified or improved over time. For example, it may be desirable to start with conservative warm up values and gradually reduce those warm up values. Or, the number of groups may be relatively small to begin with (e.g., start with two groups) and gradually the number of groups increases (e.g., redistribute logic previously in two groups amongst three groups).

Figure 6:
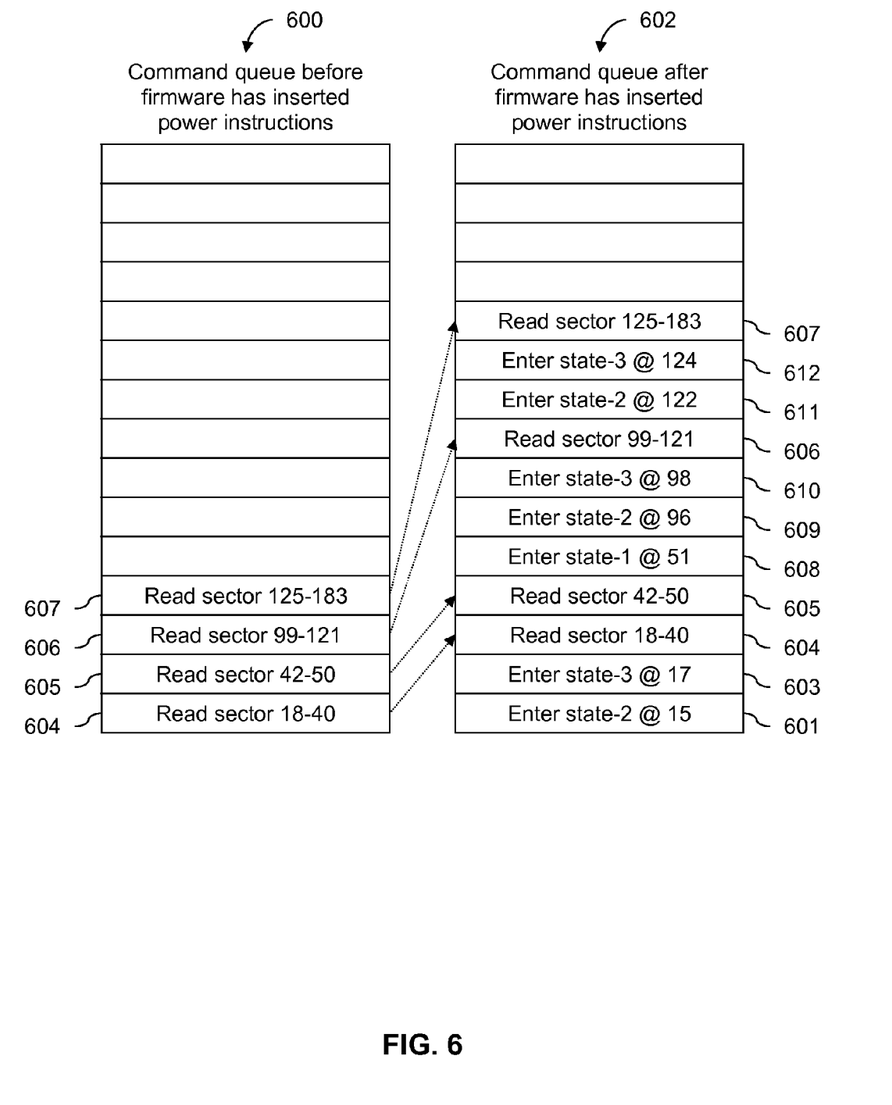
FIG. 6 is a diagram showing an embodiment of a command queue before and after power instructions are inserted.

FIG. 6 is a diagram showing an embodiment of a command queue before and after power instructions are inserted. In the example shown, queue 600 is an example of command queue 504a from FIG. 5 and queue 602 is an example of command queue 504b. Queue 600 shows a command queue before firmware has inserted power instructions and includes instructions 604-607 to read sectors 18-40, 42-50, 99-121, and 125-183, respectively. Read instructions 604-607 are to be executed in that particular order and data read from the disk is returned in that order.

Power instructions are inserted (e.g., between) access instructions where appropriate. For example, the firmware obtains read instruction 604. Assuming the system is in power state 1 and needs to be powered up before it can execute read instruction 604, two power instructions to power up the system are inserted before read instruction 604. Power instruction 601 causes the system (when executed) to enter power state 2 at sector 15; two sectors later at sector 17, power instruction 603 causes the system to enter power state 3. Read instruction 605 is then obtained. Since there is only one sector (i.e., sector 41) between desired sectors 18-40 and 42-50, there is not enough time to enter a power down state and no power instruction is inserted between read instructions 604 and 605 in command queue 602. The firmware then processes the next read instruction, 606. There are 48 sectors between desired sectors 42-50 and 99-121 and a number of power down states can be entered at appropriate times. In this particular example, three power instructions (608-610) are inserted in command queue 602 between read instructions 605 and 606. When executed in order, instructions 605, 608-610, and 606 will cause the system to read sectors 42-50, enter a power state 1 at sector 51, enter power state 2 at sector 96, enter power state 3 at sector 98, and read sectors 99-121. The next read instruction (607) is then processed. There are three sectors (i.e., sectors 122-124) between desired sectors 99-121 and 125-183 and there is not enough time for power state 1. Two power instructions (611 and 612) are inserted between read instructions 606 and 607, which when executed cause the system to enter power state 2 at sector 122 and enter power state 3 at sector 124.

Figure 7:
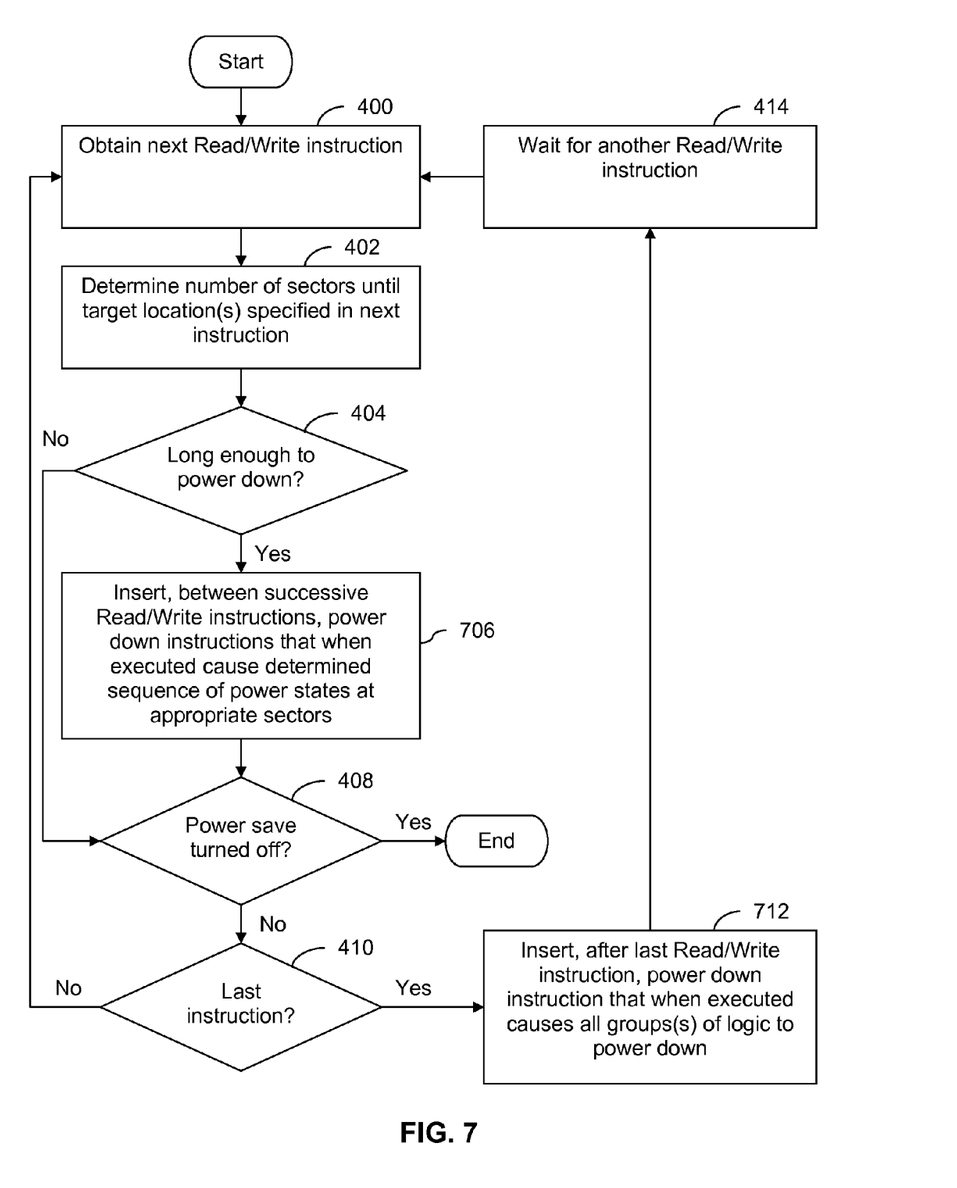
FIG. 7 is a flowchart illustrating an embodiment of a process performed by a power controller in software to power up/down groups of logic.

FIG. 7 is a flowchart illustrating an embodiment of a process performed by a power controller in software to power up/down groups of logic. The example process of FIG. 7 is performed by power controller 506 of firmware 500 in FIG. 5. The example process of FIG. 7 includes some of the same steps as the example process of FIG. 4. Those steps which are the same have the same reference numbers. If at 404 it is determined there is long enough to power down, at 706 power down instructions are insert between successive Read/Write instructions that when executed cause determined sequence of power states at appropriate sectors. In FIG. 6 for example, if access instructions 605 and 606 are being processed, power instructions are 608-610 are inserted between access instructions 605 and 606. If there is a last instruction at 410, a power down instruction is inserted after a last Read/Write instruction that when executed causes all groups(s) of logic to power down at 712. In FIG. 6 for example, if access instructions 605 and 606 are being processed, access instruction 606 is the last instruction and in this embodiment a power down instruction (not shown in FIG. 6) which causes all group(s) of logic to be powered down is inserted after/above access instruction 606 in command queue 602.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for controlling a group of logic, comprising:
    obtaining a first target location in a disk included in the hard disk system, including by obtaining, from a command queue, a first access instruction associated with accessing the first target location;
    obtaining a second target location in the disk included in the hard disk system, including by obtaining, from the command queue, a second access instruction associated with accessing the second target location, wherein the first access instruction and the second access instruction are consecutive instructions in the command queue;
    calculating a number of units between the first target location and the second target location;
    determining whether there is time for the group of logic to transition from a lower power state to an operational state in which the group of logic is capable of accessing the target location, in the event the group of logic is put into the lower power state, wherein the determination is based at least in part on (1) the number of units between (a) the first target location and (b) the second target location and (2) a warm up time associated with the group of logic; and
    in the event it is determined there is time for each piece of logic in the group to transition, using a processor to put the group of logic into the lower power state, including by inserting, between the first access instruction and the second access instruction in the command queue, a power instruction associated with putting the group of logic into the lower power state.

2. The method as recited in claim 1 further comprising in the event there is no second access instruction after the first access instruction, putting the group of logic into the lower power state.

3. The method as recited in claim 2, wherein putting the group of logic into the lower power state is performed automatically in the event is determined there is no second access instruction after the first access instruction.

4. The method as recited in claim 2, wherein the lower power state into which the group of logic is put in the event there is no second access instruction after the first access instruction includes a lowest power state.

5. The method as recited in claim 1, wherein the method is performed in software.

6. The method as recited in claim 1, wherein the method is performed in hardware.

7. The method as recited in claim 1, wherein the number of units is expressed in one or more of the following: time or sectors.

8. The method as recited in claim 1, wherein the first access instruction is a read instruction and the group of logic is associated with processing a read signal.

9. The method as recited in claim 1 further comprising in the event it is determined there is time for each piece of logic in the group to transition, putting the group of logic into a full power state prior to accessing the second target location as a result of executing the second access instruction.

10. A system for controlling a group of logic included in a hard disk drive system, comprising:
    an interface configured to:
        obtain a first target location in a disk included in the hard disk system, including by obtaining, from a command queue, a first access instruction associated with accessing the first target location; and
        obtain a second target location in the disk included in the hard disk system, including by obtaining, from the command queue, a second access instruction associated with accessing the second target location, wherein the first access instruction and the second access instruction are consecutive instructions in the command queue;
    a calculator configured to calculate a number of units between the first target location and the second target location; and
    a controller configured to:
        determine whether there is time for the group of logic to transition from a lower power state to an operational state in which the group of logic is capable of accessing the target location, in the event the group of logic is put into the lower power state, wherein the determination is based at least in part on (1) the number of units between (a) the first target location and (b) the second target location and (2) a warm up time associated with the group of logic; and
        in the event it is determined there is time for each piece of logic in the group to transition, put the group of logic into the lower power state, including by inserting, between the first access instruction and the second access instruction in the command queue, a power instruction associated with putting the group of logic into the lower power state.

11. The system as recited in claim 10, wherein the controller is further configured to: in the event there is no second access instruction after the first access instruction, put the group of logic into the lower power state.

12. The system as recited in claim 11, wherein putting the group of logic into the lower power state is performed automatically in the event is determined there is no second access instruction after the first access instruction.

13. The system as recited in claim 11, wherein the lower power state into which the group of logic is put in the event there is no second access instruction after the first access instruction includes a lowest power state.

14. The system as recited in claim 10, wherein the number of units is expressed in one or more of the following: time or sectors.

15. The system as recited in claim 10, wherein the first access instruction is a read instruction and the group of logic is associated with processing a read signal.

16. The system as recited in claim 10, wherein the controller is further configured to: in the event it is determined there is time for each piece of logic in the group to transition, put the group of logic into a full power state prior to accessing the second target location as a result of executing the second access instruction.

17. A computer program product for controlling a group of logic included in a hard disk drive system, the computer program product being embodied in a non-transitory computer readable storage medium and comprising computer instructions for:
   obtaining a first target location in a disk included in the hard disk system, including by obtaining, from a command queue, a first access instruction associated with accessing the first target location;
   obtaining a second target location in the disk included in the hard disk system, including by obtaining, from the command queue, a second access instruction associated with accessing the second target location, wherein the first access instruction and the second access instruction are consecutive instructions in the command queue;
   calculating a number of units between the first target location and the second target location;
   determining whether there is time for the group of logic to transition from a lower power state to an operational state in which the group of logic is capable of accessing the target location, in the event the group of logic is put into the lower power state, wherein the determination is based at least in part on (1) the number of units between (a) the first target location and (b) the second target location and (2) a warm up time associated with the group of logic; and
   in the event it is determined there is time for each piece of logic in the group to transition, putting the group of logic into the lower power state, including by inserting, between the first access instruction and the second access instruction in the command queue, a power instruction associated with putting the group of logic into the lower power state.

18. The computer program product as recited in claim 17 further comprising computer instructions for: in the event there is no second access instruction after the first access instruction, putting the group of logic into the lower power state.

19. The computer program product as recited in claim 17, wherein the first access instruction is a read instruction and the group of logic is associated with processing a read signal.

20. The computer program product as recited in claim 17 further comprising computer instructions for: in the event it is determined there is time for each piece of logic in the group to transition, putting the group of logic into a full power state prior to accessing the second target location as a result of executing the second access instruction.

* * * * *